(12) United States Patent
Liu et al.

(10) Patent No.: US 11,301,004 B2
(45) Date of Patent: Apr. 12, 2022

(54) REDUCING DEGRADATION OF WI-FI SIGNALS FOR COMPUTERS

(71) Applicant: HEWLETT-PACKARD DEVELOPMENT COMPANY, L.P., Houston, TX (US)

(72) Inventors: Chun-Chih Liu, Taipei (CN); Chih-Chen Hung, Taipei (CN); Kuo-Chih Huang, Taipei (CN); Cheng-Feng Liao, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 833 days.

(21) Appl. No.: 16/075,714

(22) PCT Filed: Apr. 21, 2017

(86) PCT No.: PCT/US2017/028720
§ 371 (c)(1),
(2) Date: Aug. 6, 2018

(87) PCT Pub. No.: WO2018/194633
PCT Pub. Date: Oct. 25, 2018

(65) Prior Publication Data
US 2021/0208637 A1 Jul. 8, 2021

(51) Int. Cl.
*G06F 1/16* (2006.01)
*G06F 3/023* (2006.01)
*H01Q 1/22* (2006.01)

(52) U.S. Cl.
CPC .......... *G06F 1/1662* (2013.01); *G06F 1/1698* (2013.01); *G06F 3/0231* (2013.01); *H01Q 1/2266* (2013.01)

(58) Field of Classification Search
CPC .... G06F 1/1662; G06F 3/0231; G06F 1/1698; H01Q 1/2266
See application file for complete search history.

(56) References Cited

U.S. PATENT DOCUMENTS

| | | | |
|---|---|---|---|
| 7,999,748 | B2 | 8/2011 | Ligtenberg et al. |
| 8,907,858 | B2 | 12/2014 | Yang et al. |
| 9,087,662 | B2 | 7/2015 | Chen et al. |
| 9,274,564 | B2 | 3/2016 | Chang et al. |
| 9,369,187 | B1 | 6/2016 | Sammeta et al. |

(Continued)

FOREIGN PATENT DOCUMENTS

| | | |
|---|---|---|
| CN | 103401577 A | 11/2013 |
| CN | 105656509 A | 6/2016 |

OTHER PUBLICATIONS

Balanis et al, "Integrated Antennas for Wireless Personal Communications", Wiley Online Library, Nov. 26, 2007, 1 Page.

*Primary Examiner* — Amit Chatly
(74) *Attorney, Agent, or Firm* — Fabian VanCott

(57) ABSTRACT

A system for reducing degradation of Wi-Fi signals for computers includes a first antenna of a Wi-Fi module disposed within a first region of the computer and a second antenna of the Wi-Fi module disposed within a second region of the computer wherein the regions are separated by a distance such that the first antenna and the second antenna are not subjected to degradation of the Wi-Fi signal at the same time due to a user's hands blocking the Wi-Fi signal when typing.

19 Claims, 10 Drawing Sheets

(56) References Cited

U.S. PATENT DOCUMENTS

| | | | |
|---|---|---|---|
| 2006/0118625 A1* | 6/2006 | Sekita | G06F 1/162 |
| | | | 235/451 |
| 2007/0273594 A1 | 11/2007 | Shimasaki et al. | |
| 2009/0325528 A1 | 12/2009 | Yokota | |
| 2012/0146817 A1* | 6/2012 | Tang | G06F 3/0202 |
| | | | 341/22 |
| 2012/0212417 A1* | 8/2012 | Chen | G06F 3/0231 |
| | | | 345/168 |
| 2014/0132461 A1 | 5/2014 | Kim et al. | |
| 2014/0135060 A1 | 5/2014 | Mercer | |
| 2014/0269977 A1* | 9/2014 | Yang | H04B 7/0834 |
| | | | 375/295 |
| 2015/0114813 A1* | 4/2015 | Chen | G06F 3/0202 |
| | | | 200/5 A |
| 2015/0146357 A1* | 5/2015 | Chang | G06F 1/1662 |
| | | | 361/679.09 |

* cited by examiner

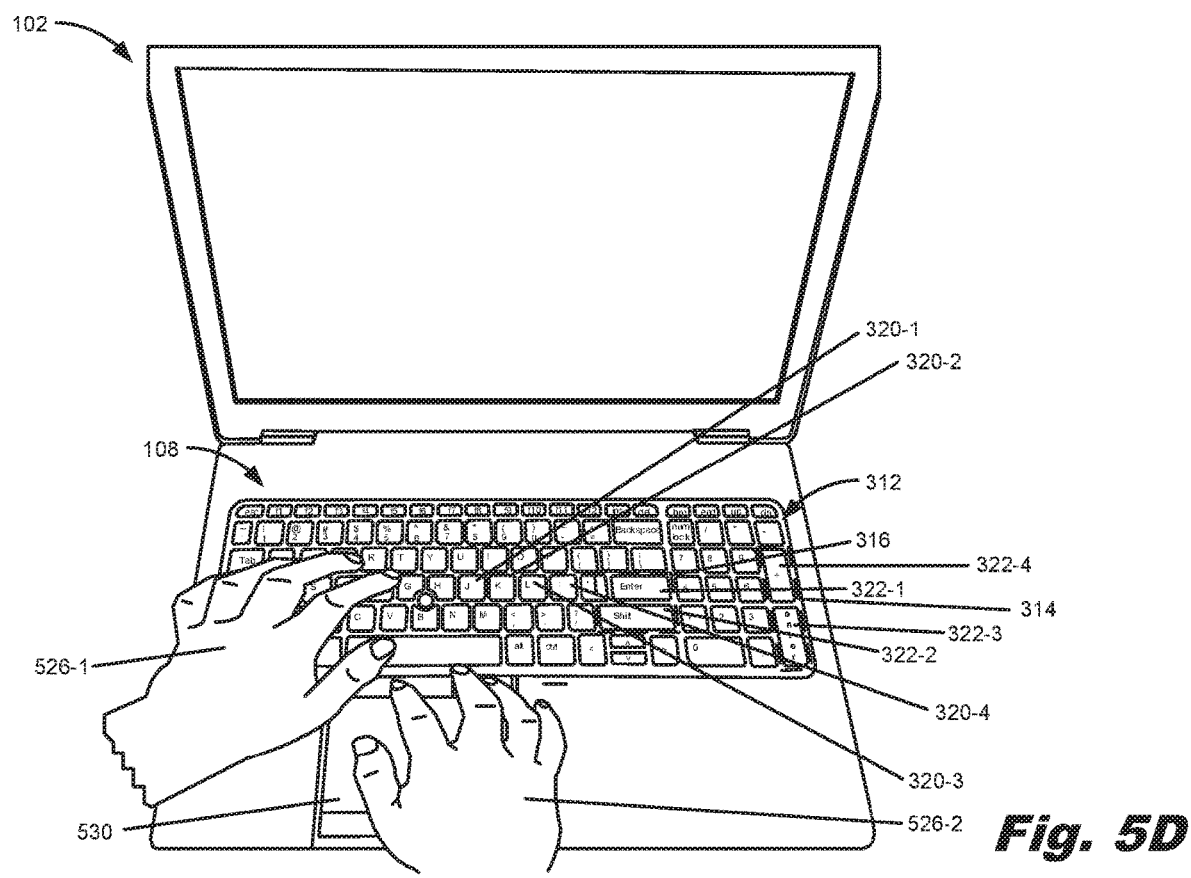

REDUCING DEGRADATION OF WI-FI SIGNALS FOR COMPUTERS

BACKGROUND

A Wi-Fi network is a wireless local area network that enables a computer such as a desktop computer, a laptop, a tablet or a smart phone to wirelessly communicate with other computers, peripheral devices and the internet. To wirelessly communicate, the computer includes networking hardware, such as a Wi-Fi module. The Wi-Fi module includes a processor, memory and an antenna that allows the computer to connect to the Wi-Fi network such that the computer can exchange data with the other computers, the peripheral devices and the internet.

BRIEF DESCRIPTION OF THE DRAWINGS

The accompanying drawings illustrate various examples of the principles described herein and are a part of the specification. The examples do not limit the scope of the claims.

FIG. 5D is a diagram of an example for reducing degradation of Wi-Fi signals for computers due to a user's hands blocking a Wi-Fi signal, according to one example of principles described herein.

Throughout the drawings, identical reference numbers designate similar, but not necessarily identical, elements.

DETAILED DESCRIPTION

Figure 1A:
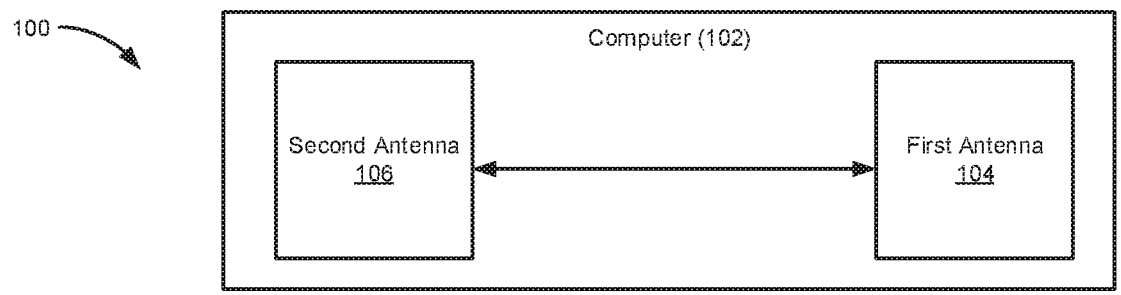
FIG. 1A is a block diagram of a system for reducing degradation of Wi-Fi signals for computers, according to one example of principles described herein.

As noted above, to wirelessly communicate, the computer includes networking hardware, such as a Wi-Fi module. The Wi-Fi module includes a processor, memory and an antenna that allows the computer to connect to the Wi-Fi network such that the computer can exchange data with the other computers, the peripheral devices and the internet.

The Wi-Fi module is often disposed within a computer. In an example, a housing of the computer is made out of materials that can have a negative impact on an efficiency of the antenna. In another example, a user's hands can have a negative impact on the efficiency of the antenna when, for example, the user's hands are in proximity to the antenna. This can lead to degradation of a Wi-Fi signal for the computer. If degradation of the Wi-Fi signal is substantial, the computer may not be able to wirelessly connect to the other computers, the peripheral devices and the internet via the Wi-Fi network.

Consequently, the present specification describes a system for reducing degradation of Wi-Fi signals for computers. Such a system includes a first antenna of a Wi-Fi module disposed within a first region of the computer and a second antenna of the Wi-Fi module disposed within a second region of the computer wherein the regions are separated by a distance such that the first antenna and the second antenna are not subjected to degradation of the Wi-Fi signal at the same time due to a user's hands blocking the Wi-Fi signal when typing.

In another example, a system for reducing degradation of Wi-Fi signals for computers includes a first antenna of a Wi-Fi module disposed within a first region of a keyboard and a second antenna of the Wi-Fi module disposed within a second region of the keyboard wherein the regions of the keyboard where the antennas are disposed are based on a layout of the keyboard such that a user's hands do not interfere with the Wi-Fi signal for the first antenna and the second antenna at the same time when typing via the keyboard.

In another example, the present specification describes a method for reducing degradation of Wi-Fi signals for computers by with a first antenna of a Wi-Fi module disposed within a first region of a keyboard of the computer and a second antenna of the Wi-Fi module disposed within a second region of the keyboard of the computer, exchanging data over a Wi-Fi network via the antennas of the Wi-Fi module, in response to degradation of the Wi-Fi signal for the first antenna due to a user's hands, instructing a processor to exchange the data over the Wi-Fi network via the second antenna and in response to degradation of the Wi-Fi signal for the second antenna due to the user's hands, instructing the processor to exchange the data over the Wi-Fi network via the first antenna.

In the present specification and in the appended claims, the term "region" means a section within a computer where an antenna of a Wi-Fi module is disposed. In an example, the region is associated with specific keys on a keyboard of the computer.

Further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1A is a block diagram of a system for reducing degradation of Wi-Fi signals for computers, according to one example of principles described herein. As shown in FIG. 1A, the system (100) includes a first antenna (104) of a Wi-Fi module (210) and a second antenna (106) of a Wi-Fi module (210) that are disposed within a computer (102).

The first antenna (104) of the Wi-Fi module (201) is disposed within a first region (314) of the computer (102). The second antenna (106) of the Wi-Fi module (210) is disposed within a second region (316) of the computer (102).

The regions (314 and 316) are separated by a distance, as illustrated by the arrow in FIG. 1A, such that the first antenna (104) and the second antenna (106) are not subjected to degradation of a Wi-Fi signal at the same time due to a user's hands blocking the Wi-Fi signal when typing.

Figure 1B:
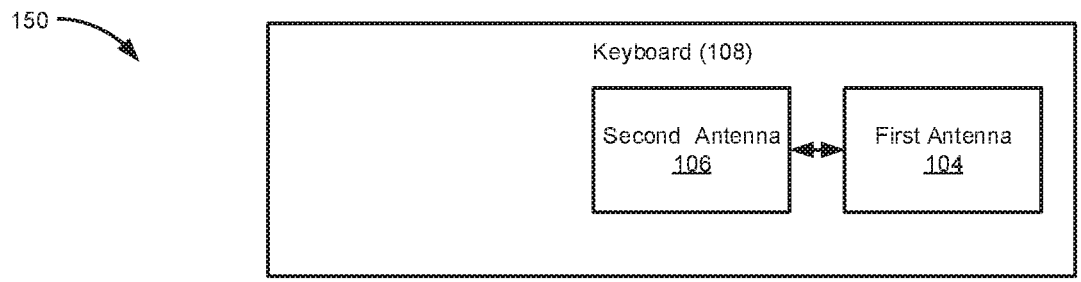
FIG. 1B is a block diagram of a system for reducing degradation of Wi-Fi signals for computers, according to one example of principles described herein.

FIG. 1B is a block diagram of a system for reducing degradation of Wi-Fi signals for computers, according to one example of principles described herein. As shown in FIG. 1B, the system (150) includes a first antenna (104) of the Wi-Fi module (210) and a second antenna (106) of the Wi-Fi module (210) that are disposed within a keyboard (108).

The first antenna (104) of a Wi-Fi module (210) disposed within a first region (314) of a keyboard (108). The second antenna (106) of the Wi-Fi module (210) disposed within a second region (316) of the keyboard (108).

In an example, the regions (314 and 316) of the keyboard (108) where the antennas (104 and 106) are disposed are based on a layout of the keyboard (108) such that a user's hands (526) do not interfere with the Wi-Fi signal for the first antenna (104) and the second antenna (106) at the same time when typing via the keyboard (108).

Figure 2:
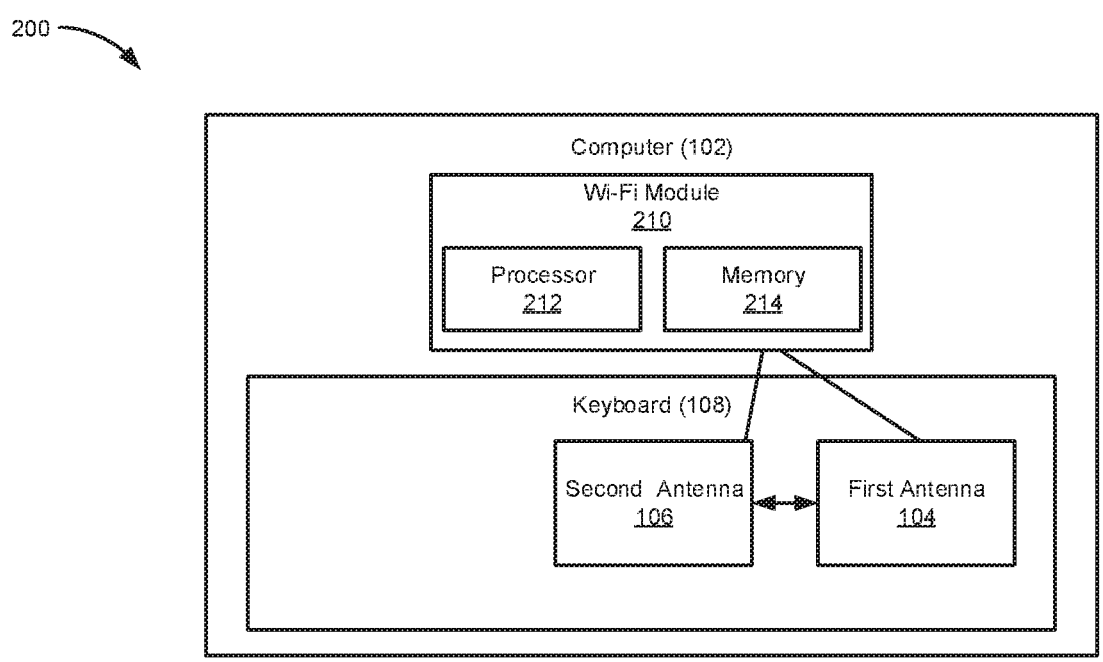
FIG. 2 is a block diagram of a system for reducing degradation of Wi-Fi signals for computers, according to one example of principles described herein.

FIG. 2 is a block diagram of a system for reducing degradation of Wi-Fi signals for computers, according to one example of principles described herein. As shown in FIG. 2, the system (200) includes a computer (102) with a keyboard (108). Disposed within the computer (102) is a Wi-Fi module (210). Disposed within the keyboard (108) are two antennas (104 and 106).

The computer (102) is a computing device such as a desktop computer, a laptop, a tablet or a smart phone. As will be illustrated in subsequent figures, the computer (102) is a laptop.

The computer (102) wirelessly communicates with other computers, peripheral devices and the internet. To wirelessly communicate, the computer (102) includes networking hardware, such as a Wi-Fi module (210) that allows the computer (102) to wirelessly communicate with other computing devices via a Wi-Fi network. The Wi-Fi module (210) includes a processor (212) and memory (214). The processor (212) and memory (214) are communicatively coupled to perform the designated functions of the Wi-Fi module (210). Such functions include connecting to a Wi-Fi network and exchanging data over the Wi-Fi network.

The Wi-Fi module (210) includes a first antenna (104) and a second antenna (106). The antennas (104 and 106) are devices which convert electric power into radio waves when sending data via the Wi-Fi module (210) to the Wi-Fi network. However, the antennas (104 and 106) convert radio waves into electric power when the Wi-Fi module (210) receives data from the Wi-Fi network. In an example, the antennas (104 and 106) are capable of receiving and sending data over a 2.4 gigahertz and a 5 gigahertz radio band.

As will be described in FIG. 3, the antennas (104 and 106) are disposed within a keyboard (108) of the computer (102). Specifically, the first antenna (104) of a Wi-Fi module (210) is disposed within a first region (314) of a keyboard (108). The second antenna (106) of the Wi-Fi module (210) is disposed within a second region (316) of the keyboard (108). In an example, the regions (314 and 316) of the keyboard (108) where the antennas (104 and 106) are disposed are based on a layout of the keyboard (108) such that a user's hands (526) do not interfere with a Wi-Fi signal for the first antenna (104) and the second antenna (106) at the same time when typing via the keyboard (108).

Figure 3:
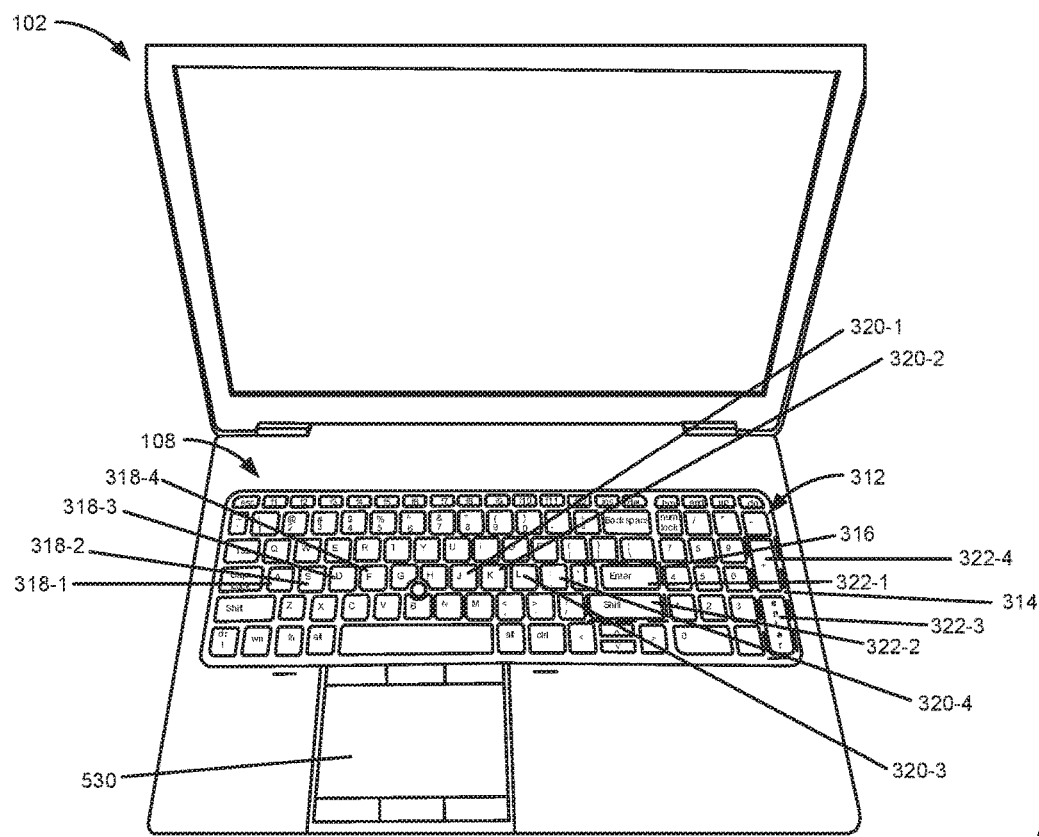
FIG. 3 is a diagram of a number of regions where antennas are disposed in a computer, according to one example of principles described herein.

FIG. 3 is a diagram of a number of regions where antennas are disposed in a computers, according to one example of principles described herein. As mentioned above, the antennas (104 and 106) are disposed within regions (314 and 316) of a keyboard (108) of the computer (102).

In an example, the regions of the keyboard (108) where the antennas (104 and 106) are disposed are based on a layout of the keyboard (108) such that a user's hands (526) do not interfere with a Wi-Fi signal for the first antenna (104) and the second antenna (106) at the same time when typing via the keyboard (108). As shown in FIG. 3, the keyboard (108) has an American National Standards Institute (ANSI) keyboard layout. The keyboard (108) has a numeric keypad (312). The numeric keypad (312) is independent from the character keys of the keyboard (108).

While other keyboards with different mechanical layouts, visual layouts and functional layouts exist, for purposes of explanation, the regions (314 and 316) where the antennas (104 and 106) are disposed are based on a layout of the keyboard (108) illustrated in FIG. 3. As a result, it should be understood that these regions (314 and 316) may only be valid for the layout of the keyboard (108) illustrated in FIG. 3. Further, other regions may be selected according to the principles described herein for other keyboard layouts. Specifically, having at least two antennas disposed within separate regions of the keyboard such that a user's hands will not be placed in both regions at the same time when operating the computer.

The regions (314 and 316) are such that it is unlikely that the user's hands (526) will be placed in these regions (314 and 316) at the same time. For example, when the user is typing on the keyboard (108), the user's left hand (526-1) is normally placed above character keys A (318-1), S (318-2), D (318-3) and F (318-4), The user's left hand (526-1) may also be placed on nearby keys. When the user is typing on the keyboard (108), the user's right hand (526-2) is normally placed above keys J (320-1), K (320-2), I (320-3) and; (320-4). The user's right hand may also be placed on other nearby keys. Further, user's right hand (526-2) may transition from keys J (320-1), K (320-2), I (320-3) and; (320-4) and nearby keys to the numeric keypad (312). In this example, it is unlikely that the user's left hand (526-1) will ever occupy any locations on the keyboard (108) where the user's right hand (526-2) occupies, even when the user's right hand (526-2) transition from the keys J (320-1), K (320-2), I (320-3) and; (320-4) and nearby keys to the numeric keypad (312). As a result, while the user's right hand (526-2) may block a Wi-Fi signal for one of the regions (314 and 316) where the antennas (104 and 106) are disposed, the user's right hand (526-2) will not block the Wi-Fi signal for both the regions (314 and 316) at the same time. More information about these regions is described below.

The antennas (104 and 106) are defined by a length and a diameter. Since the antennas (104 and 106) are disposed within the keyboard (108), the keys for the selected regions for the antennas (104 and 106) are to be large enough to physically accommodate the antennas (104 and 106). If the keys for the selected regions for the antennas (104 and 106)

are too small to physically accommodate the antennas (104 and 106), the keys for that selected region may contact the antennas (104 and 106) when depressed by the user. This can lead to improper function of the keys and/or wear and tear on the antennas (104 and 106). If the antennas (104 and 106) are subjected to substantial wear and tear, the performance of the antennas (104 and 106) may decline such that the Wi-Fi module (210) can no longer exchange data over a Wi-Fi network. As a result, a region where an antenna is disposed is selected based on a size of a key of the keyboard (108) for that region.

As illustrated in FIG. 3, some keys of the keyboard (108) are larger in size, as defined by length and width, than other keys. These keys include, a left shift key, a caps lock key, a space bar, a right shift key (322-2), an enter key (322-1), a back space key, a zero key on the numeric keypad (312) and a plus key (322-4) on the numeric keypad (312) and an enter key (322-3) on the numeric keypad (312). These keys are large enough to accommodate the antennas (104 and 106). As a result, the keys of the keyboard associated with the regions where the antennas (104 and 106) are disposed are sized to accommodate the antennas (104 and 106).

As illustrated, the first antenna (104) of a Wi-Fi module (210) is disposed within the first region (314) of the keyboard (108). The first region (314) is associated with a numeric keypad (312) of the keyboard (108). Specially, the first region (314) is associated with the plus key (322-4) and the enter key (322-3) of the numeric keypad (312). The first region (314) is associated with the numeric keypad (312) because the user's hands will not occupy the first region (314) and the second region (316) at the same time. As mentioned above, the first region (314) is associated with the plus key (322-4) and the enter key (322-3) of the numeric keypad (312) because these keys are large enough to physically accommodate the first antenna (104).

The second antenna (106) of the Wi-Fi module (210) is disposed within the second region (316) of the keyboard (108). The second region (316) is associated with a location on the keyboard (108) of the computer (102) where a user's right hand (526-2) is placed when typing characters. Specially, the second region (316) is associated with the right-shift key (322-2) and the enter key (322-1) of the keyboard (108) of the computer (102) when the keyboard has an American National Standards Institute (ANSI) keyboard layout. The second region (316) is associated with this section of the keyboard (108) because the user's hands (526) will not occupy the first region (314) and the second region (316) at the same time. As mentioned above, the second region (316) is associated with the right-shift key (322-2) and the enter key (322-1) of the keyboard (108) because these keys are large enough to physically accommodate the second antenna (106).

Figure 4:
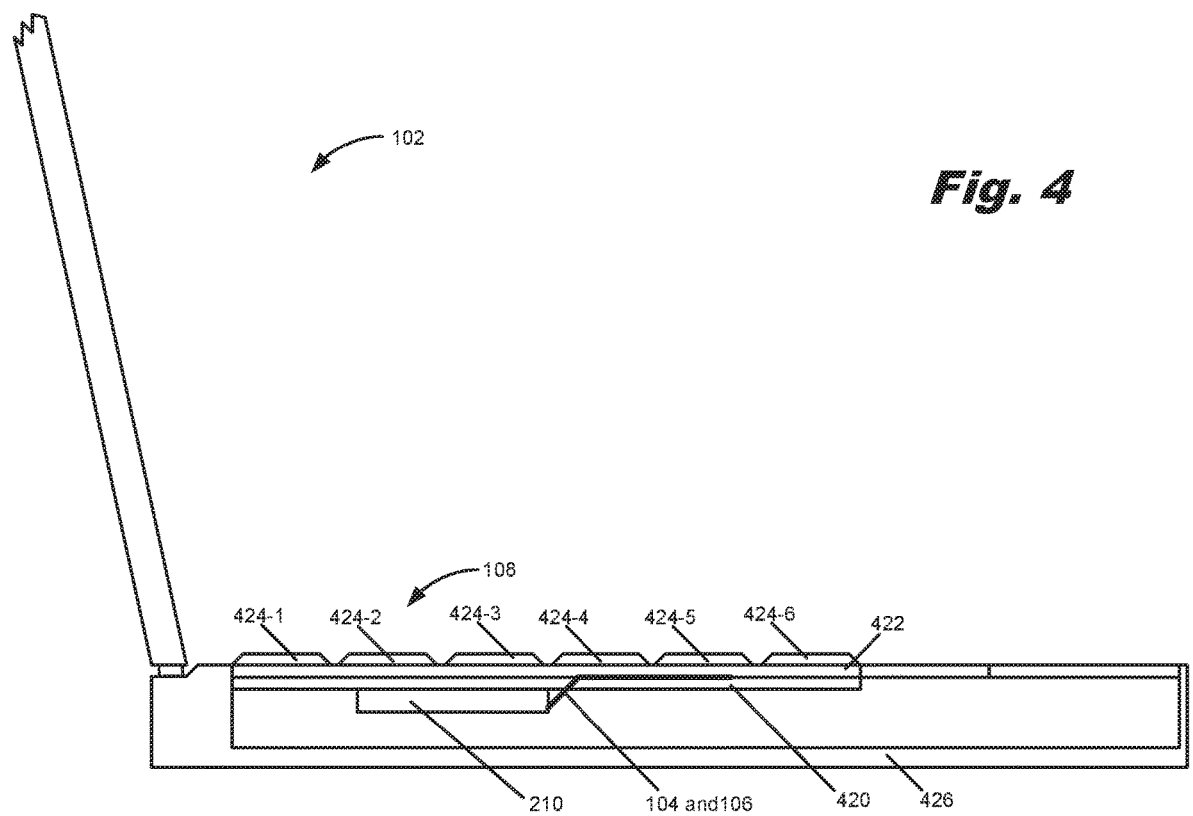
FIG. 4 is a side view of a computer, according to one example of principles described herein.

FIG. 4 is a side view of a computer, according to one example of principles described herein. As will be described below, the antennas (104) are disposed between a rubber dome (422) positioned under the keys (424) of the keyboard (108) and a metal sheet (420).

As illustrated, the computer (102) includes a housing (426). The housing (426) is made of a number of materials. The materials include plastics and metals. The housing (426) is designed to internally house a number of components. These components include electronics such as memory, processors, a Wi-Fi module (210), wires, light emitting diodes (LEDs), among other electronics. As a result, these components are disposed internally to the computer (102).

The housing (426) provides a platform for other components of the computer (102). This includes a keyboard (108), keys (424), a rubber dome (422) and a metal sheet (420). In an example, the rubber dome (422) is positioned under the keys (424) of the keyboard (108). Further, the metal sheet (420) is positioned below the rubber dome (422). As a result, some of these components are external to the housing (426) while some of these components are internal to the housing (426).

As mentioned, antennas (104 and 106) are disposed within regions of the keyboard (108) of the computer (102). Certain materials such as the housing (426) and electronics disposed within the computer (102) can block a Wi-Fi signal. It is advantageous to select regions where the Wi-Fi signal for the antennas (104 and 106) will not be blocked. As illustrated in the side view of the computer (102) in FIG. 4, the antennas (104 and 106) are disposed between a rubber dome (422) positioned under the keys (424) of the keyboard (108) and a metal sheet (420). As a result, the Wi-Fi signal for the antennas (104 and 106) will not be blocked by electronic components disposed within the computer (102).

FIGS. 5A-5D give examples of how the regions (314 and 316) of the keyboard (108) where the antennas (106 and 104) are disposed are such that a user's hands (526) do not interfere with the Wi-Fi signal for the first antenna (104) and the second antenna (106) at the same time when typing via the keyboard (108). As a result, at least one of the antennas (104 and 106) is able to exchange data over the Wi-Fi network.

Figure 5A:
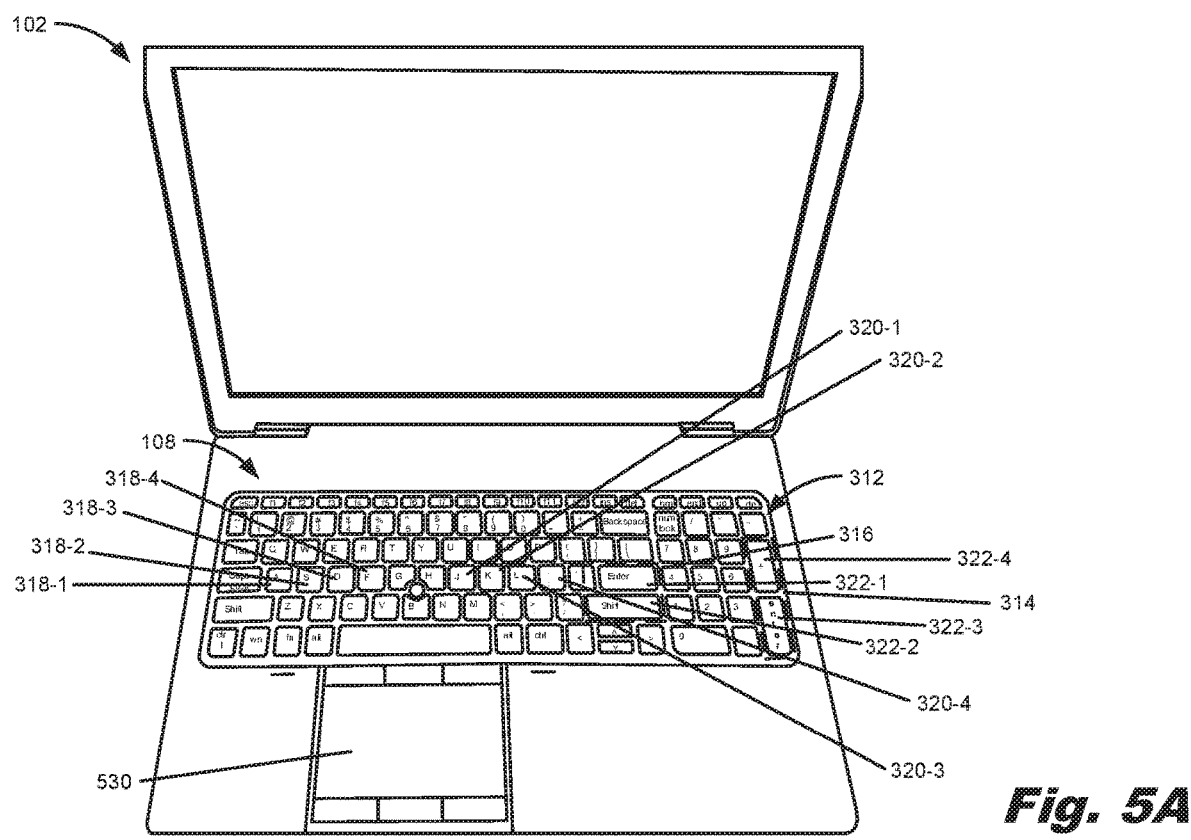
FIG. 5A is a diagram of an example for reducing degradation of Wi-Fi signals for computers due to a user's hands blocking a Wi-Fi signal, according to one example of principles described herein.

FIG. 5A is a diagram of an example for reducing degradation of Wi-Fi signals for computers due to a user's hands blocking the Wi-Fi signal, according to one example of principles described herein. As mentioned above, the antennas (106 and 104) are disposed within the keyboard (108) of the computer (102) such that the user's hands (526) do not interfere with the Wi-Fi signal for the first antenna (104) and the second antenna (106) at the same time.

As illustrated in FIG. 5A, the first antenna (104) of a Wi-Fi module (210) is disposed within the first region (314) of the keyboard (108). The first region (314) is associated with the numeric keypad (312) of the keyboard (108). The second antenna (106) of the Wi-Fi module (210) is disposed within the second region (316) of the keyboard (108). The second region (316) is associated with a location on the keyboard (108) of the computer (502) where a user's right hand (526-2) is placed when typing characters In some instances, the user's hands (526) are not placed keyboard (108) as illustrated in FIG. 5A. Since the user's hands (526) are not interfering with the Wi-Fi signal because the users hands (526) are not in proximity to the antennas (104 and 106), both antennas (104 and 106) exchange data over the Wi-Fi network at the same time. For example, both antennas (104 and 106) send data at the same time as instructed by the Wi-Fi module (210). Further, both antennas (104 and 106) receive, via the Wi-Fi signal of the Wi-Fi network, data at the same time.

Figure 5B:
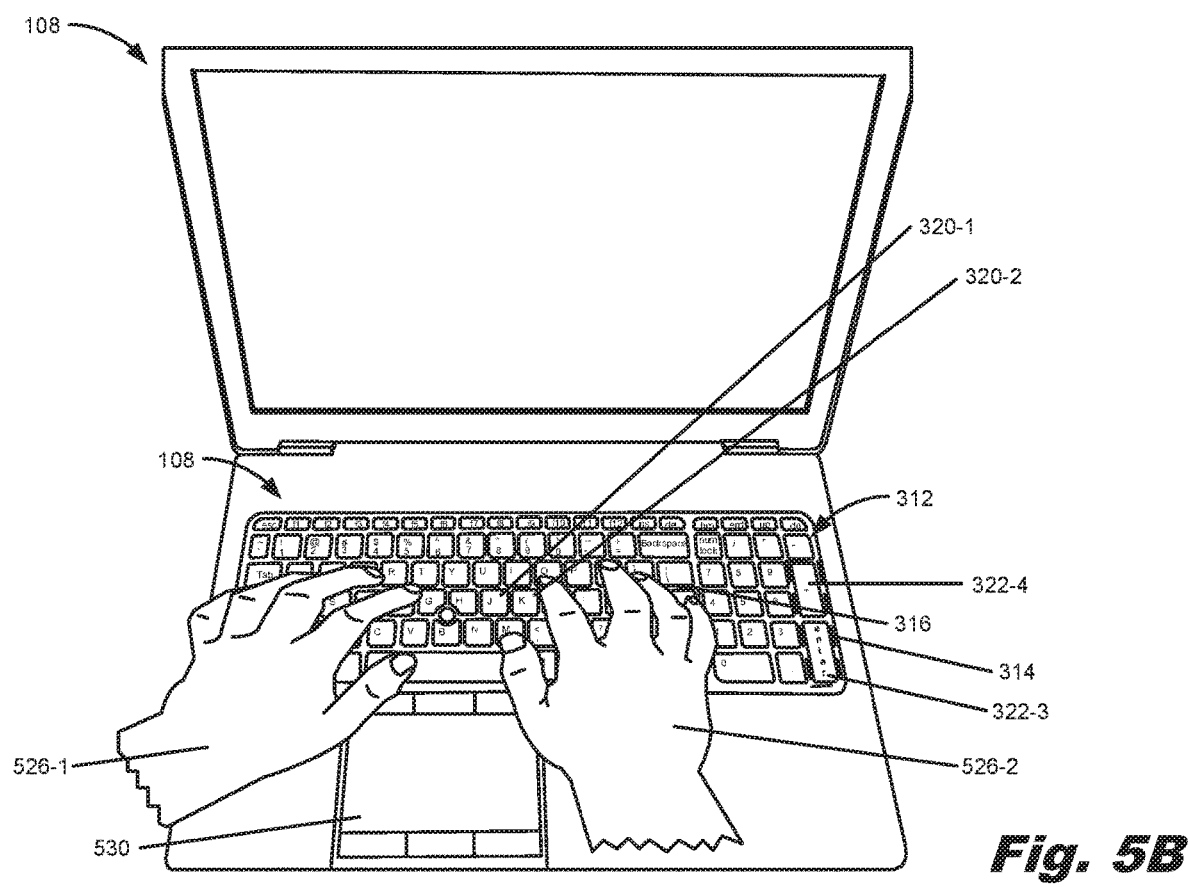
FIG. 5B is a diagram of an example for reducing degradation of Wi-Fi signals for computers due to a user's hands blocking a Wi-Fi signal, according to one example of principles described herein.

FIG. 5B is a diagram of an example for reducing degradation of Wi-Fi signals for computers due to a user's hands blocking the Wi-Fi signal, according to one example of principles described herein. As will be described below, a user's right hand (526-2) blocks the Wi-Fi signal for the second antenna (106).

As illustrated in FIG. 5B, when a user is typing characters with both hands (526), this position of the hands (526) on the keyboard (512) is typical. For example, when the user is typing on the keyboard (108), the user's left hand (526-1) is normally placed above character keys A (318-1), S (318-2), D (318-3) and F (318-4). The user's left hand (526-1) may also be placed on keys nearby. As a result, the user's left hand (526-1) typically will not block the Wi-Fi signal for the first antenna (104) or the second antenna (106) since the user's left hand (526-1) is not placed over the first region (316) or the second region (314) where the first antenna (104) and the second antenna (106) are disposed within the keyboard (108).

However, when the user is typing on the keyboard (108), the user's right hand (526-2) is normally placed above keys J (320-1), K (320-2), I (320-3) and; (320-4). The user's right hand (526-2) may also be placed on keys nearby. As illustrated in FIG. 5B the user's right hand (526-2) is placed over the second region (316). Since the user's right hand (526-2) is placed over the second region (316), the user's right hand (526-2) blocks the Wi-Fi signal for the second antenna (106). However, in this position, the user's right hand (526-2) is not placed over the first region (314). As a result, only the first antenna (104) is capable of exchanging the data over the Wi-Fi network. In this example, both antennas (104 and 106) try to exchange the data over the Wi-Fi network at the same time as instructed to via the Wi-Fi module (210). Because the Wi-Fi signal for the second antenna (106) is blocked by the user's right hand (526-2), the data for is not likely to be exchanged with the Wi-Fi network via the second antenna (106). However, because the Wi-Fi signal for the first antenna (104) is not blocked by the user's right hand (526-2), the data is exchanged over the Wi-Fi network via the first antenna (104).

Figure 5C:
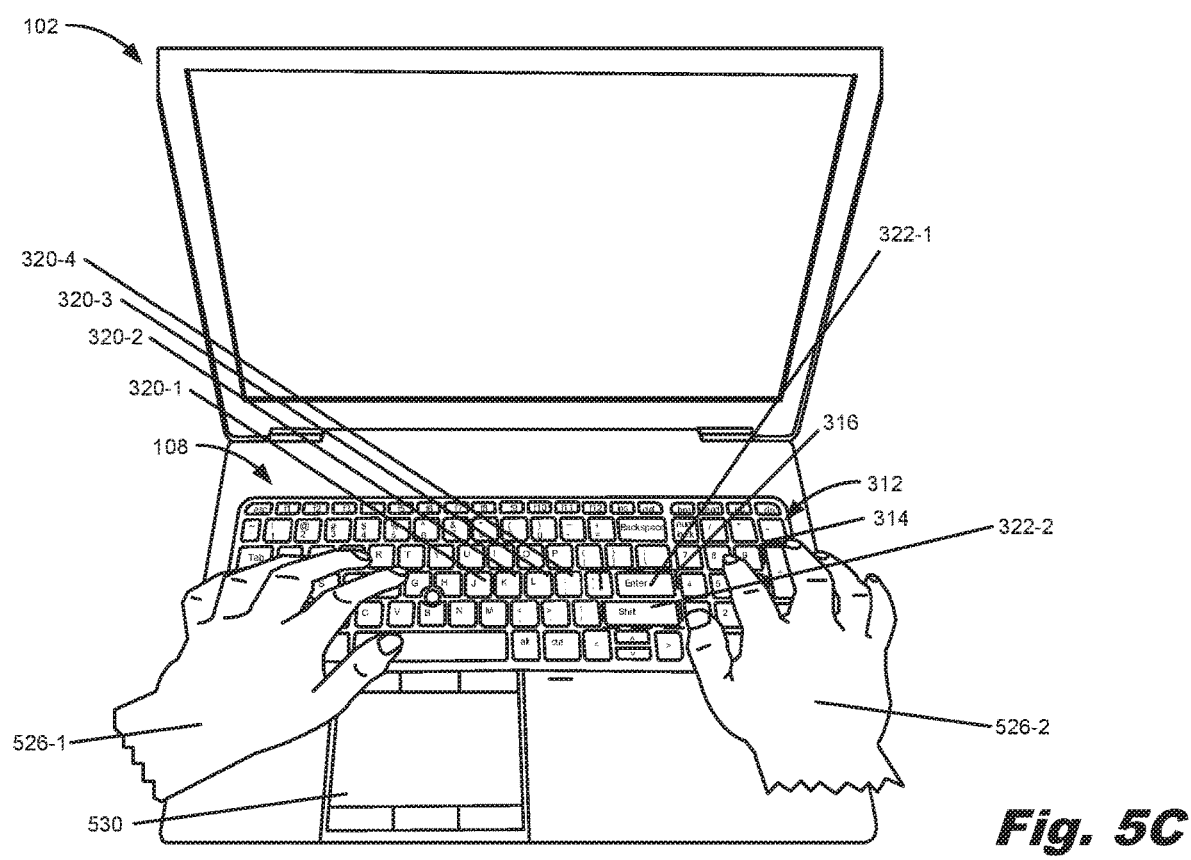
FIG. 5C is a diagram of an example for reducing degradation of Wi-Fi signals for computers due to a user's hands blocking a Wi-Fi signal, according to one example of principles described herein.

FIG. 5C is a diagram of an example for reducing degradation of Wi-Fi signals for computers due to a user's hands blocking the Wi-Fi signal, according to one example of principles described herein. As will be described below, a user's right hand (526-2) blocks the Wi-Fi signal for the first antenna (104).

As illustrated in FIG. 5C, the user's left hand (526-1) is placed in the same positon as FIG. 5B. As a result, the user's left hand (526-1) will not block the Wi-Fi signal for the first antenna (104) or the second antenna (106) since the user's left hand (526-1) is not placed over the first region (314) or the second region (316) where the first antenna (104) and the second antenna (106) are disposed within the keyboard (108).

As illustrated in FIG. 5C the user's right hand (526-2) is placed over the first region (314) when transitioning from the character keys to the numeric keypad (312). Since the user's right hand (526-2) is placed over the first region (314), the user's right hand (526-2) blocks the Wi-Fi signal for the first antenna (104). However, in this position, the user's right hand (526-2) is not placed over the second region (316). As a result, the second antenna (106) is able to exchange data over the Wi-Fi network. In this example, both antennas (104 and 106) try to exchange data at the same time as instructed by the Wi-Fi module (210). Because the Wi-Fi signal for the first antenna (104) is blocked by the user's right hand (526-2), the data is not exchanged over the Wi-Fi network via the first antenna (104). However, the Wi-Fi signal for the second antenna (106) is not blocked by the user's right hand (526-2). As a result, the data is exchanged over the Wi-Fi network via the second antenna (106).

FIG. 5D is a diagram of an example for reducing degradation of Wi-Fi signals for computers due to a user's hands blocking the Wi-Fi signal, according to one example of principles described herein. Often, the user's right hand (526-2) is used to operate peripheral devices such as a mouse, a touchpad or other peripheral devices.

As illustrated, the user's left hand (526-1) is positioned in the same position as illustrated in FIGS. 5B and 5C. However, the user's right hand (526-2) has transitioned to operate a touchpad (530). In this position, none of the user's hands (526) are placed above the regions (314 and 316). As a result, the user's hands (526) are not blocking the Wi-Fi signal for either antenna (104 and 106). Since the user's hands (526) are not blocking the Wi-Fi signal for either antenna (104 and 106), both antennas (104 and 106) exchange data over the Wi-Fi network at the same time. For example, both antennas (104 and 106) send data over the Wi-Fi network at the same time as instructed by the Wi-Fi module (210). Further, both antennas (104 and 106) receive data at the same time via the Wi-Fi network.

Figure 6:
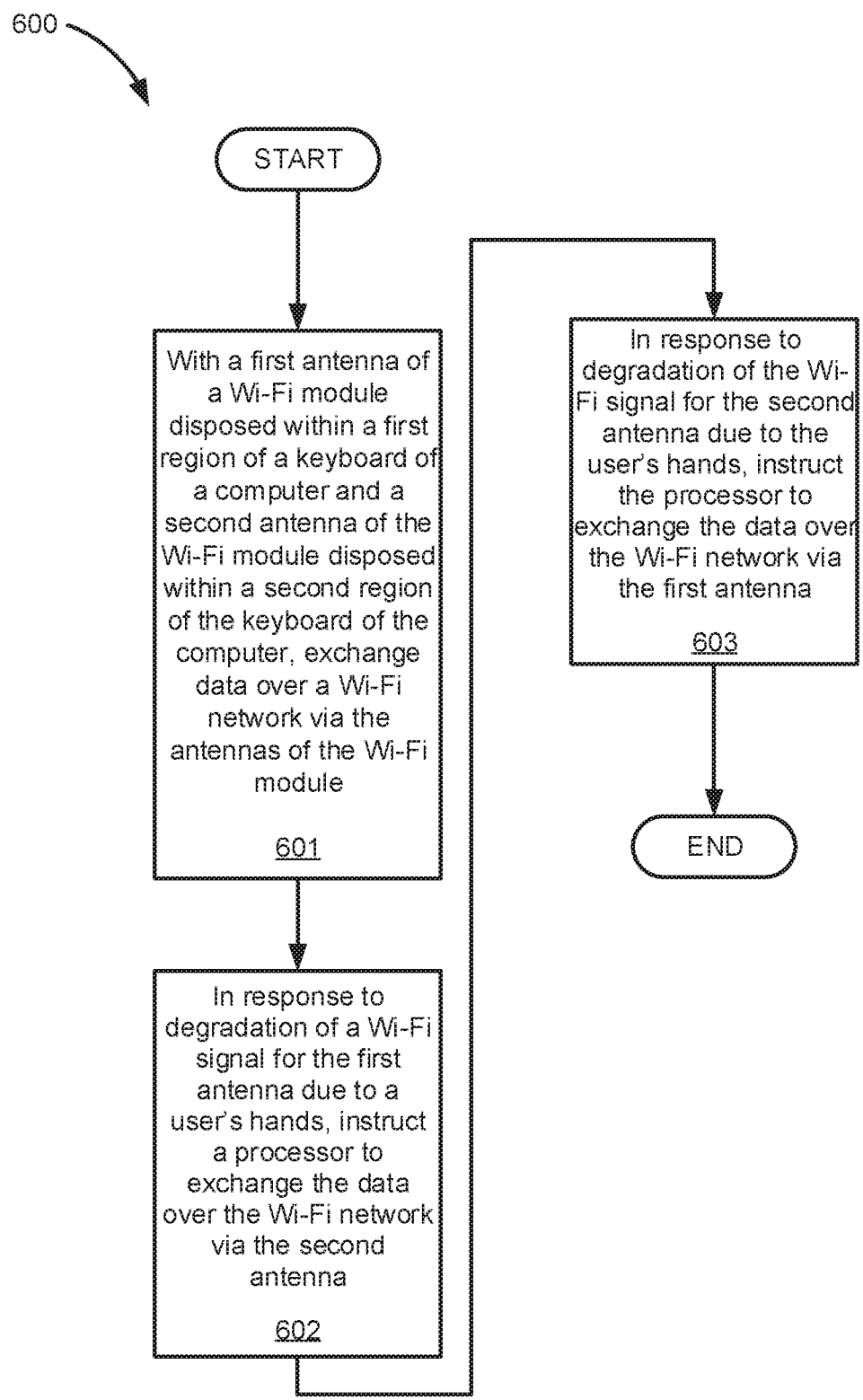
FIG. 6 is a flowchart of a method for reducing degradation of Wi-Fi signals for computers, according to one example of principles described herein.

FIG. 6 is a flowchart of a method for reducing degradation of Wi-Fi signals for computers, according to one example of principles described herein. In one example, the method (600) may be executed by the Wi-Fi module (210). In this example, the method (600) includes with a first antenna of a Wi-Fi module disposed within a first region of a keyboard of a computer and a second antenna of the Wi-Fi module disposed within a second region of the keyboard of the computer, exchanging (601) data over a Wi-Fi network via the antennas of the Wi-Fi module, with a processor of the Wi-Fi module, in response to degradation of a Wi-Fi signal for the first antenna due to a user's hands, instructing (602) the processor to exchange the data over the Wi-Fi network via the second antenna and in response to degradation of the Wi-Fi signal for the second antenna due to the user's hands, instructing (603) the processor to exchange the data over the Wi-Fi network via the first antenna.

As mentioned above, the method (600) includes with a first antenna of a Wi-Fi module disposed within a first region of a keyboard of a computer and a second antenna of the Wi-Fi module disposed within a second region of the keyboard of the computer, exchanging (601) data over a Wi-Fi network via the antennas of the Wi-Fi module, with a processor of the Wi-Fi module. In this example, since the Wi-Fi signal for the first antenna and the second antenna are not blocked by the user's hands, both antennas can send and receive data via the Wi-Fi network. As will be described below, when both antennas receive data at the same time, the data is combined by the Wi-Fi module.

As mentioned above, the method (600) includes in response to degradation of the Wi-Fi signal for the first antenna due to a user's hands, instructing (602) the processor to exchange the data over the Wi-Fi network via the second antenna. In this example, the processor receives data from the second antenna. However, the processor is not receiving data from the first antenna. Since both antennas should be sending and receiving the same data, the processor determines the first antenna must be blocked and only uses the data received by the second antenna. However, the processor of the Wi-Fi module still uses both antennas to send data because transmission of data is not guaranteed to be delivered to the Wi-Fi network and is therefore a best-effort delivery mechanism.

As mentioned above, the method (600) includes in response to degradation of the Wi-Fi signal for the second antenna due to the user's hands, instructing (603) the processor to exchange the data over the Wi-Fi network via the first antenna. In this example, the processor receives data from the first antenna. However, the processor is not receiving data from the second antenna. Since both antennas should be sending and receiving the same data, the processor determines the second antenna must be blocked and only uses the data received by the first antenna. However, the processor of the Wi-Fi module still uses both antennas to send data as described above.

Figure 7:
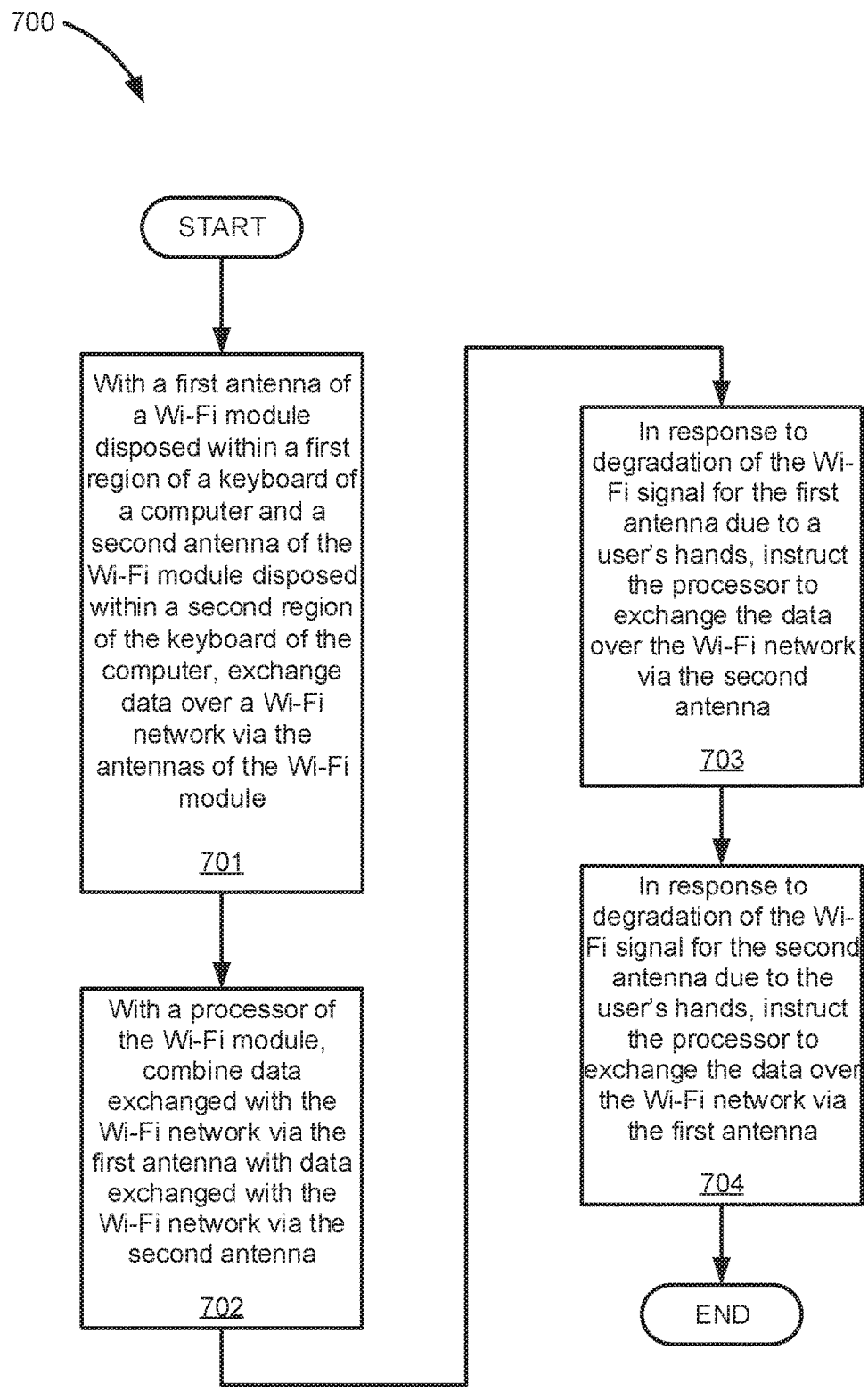
FIG. 7 is a flowchart of a method for reducing degradation of Wi-Fi signals for computers, according to one example of principles described herein.

FIG. 7 is a flowchart of a method for reducing degradation of Wi-Fi signals for computers, according to one example of principles described herein. In one example, the method (700) may be executed by the Wi-Fi module (210). In this example, the method (700) includes with a first antenna of a Wi-Fi module disposed within a first region of a keyboard of a computer and a second antenna of the Wi-Fi module disposed within a second region of the keyboard of the computer, exchanging (701) data over a Wi-Fi network via the antennas of the Wi-Fi module, with a processor of the Wi-Fi module, combining (702) data exchanged with the Wi-Fi network via the first antenna with data exchanged with the Wi-Fi network via the second antenna, in response to degradation of the Wi-Fi signal for the first antenna due to a user's hands, instructing (703) the processor to exchange the data over the Wi-Fi network via the second antenna, in response to degradation of the Wi-Fi signal for the second antenna due to the user's hands, instructing (704) the processor to exchange the data over the Wi-Fi network via the first antenna.

As mentioned above, the method (700) includes with the processor of the Wi-Fi module, combining (702) data exchanged with the Wi-Fi network via the first antenna with data exchanged with the Wi-Fi network via the second antenna. As mentioned above, the processor of the Wi-Fi module uses both antennas to exchange data. When both antennas are receiving data, the data received by each antenna is the same because the antennas receiving data at the same time. Since the data received by each antenna is the same, the processor combines the data into a single stream of data for the Wi-Fi module when both antennas are receiving data.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for reducing degradation of Wi-Fi signals for computers, the system comprising:
    a first antenna of a Wi-Fi module disposed within a first region of the computer; and
    a second antenna of the Wi-Fi module disposed within a second region of the computer;
    wherein:
    the regions are separated by a distance such that the first antenna and the second antenna are not subjected to degradation of the Wi-Fi signal at the same time due to a user's hands blocking the Wi-Fi signal when typing;
    keys within each region under which the first antenna and the second antenna are disposed are selected based on a size of the keys; and
    the antennas are positioned between a rubber dome underlying a keyboard of the computer and a metal sheet underlying the keyboard.

2. The system of claim 1, wherein the second region is associated with a location on a keyboard of the computer where the user's right hand is placed when typing characters.

3. The system of claim 2, wherein the second region is associated with a right-shift key and an enter key of the keyboard of the computer when the keyboard has an American National Standards Institute (ANSI) keyboard layout.

4. The system of claim 1, wherein the first region is associated with a numeric keypad of a keyboard.

5. The system of claim 4, wherein the first region is associated with a plus key and an enter key of the numeric keypad.

6. A system for reducing degradation of Wi-Fi signals for computers, the system comprising:
    a first antenna of a Wi-Fi module disposed within a first region of a keyboard; and
    a second antenna of the Wi-Fi module disposed within a second region of the keyboard;
    wherein:
    the regions of the keyboard where the antennas are disposed are based on a layout of the keyboard such that a single hand of the user does not interfere with the Wi-Fi signal for the first antenna and the second antenna at the same time when typing via the keyboard;
    keys within each region under which the first antenna and the second antenna are disposed are selected based on a size of the keys; and
    the antennas are positioned between a rubber dome underlying the keyboard and a metal sheet underlying the keyboard.

7. The system of claim 6, wherein the rubber dome is positioned over the metal sheet.

8. The system of claim 6, wherein keys of the keyboard associated with the regions where the antennas are disposed are sized to accommodate the antennas.

9. The system of claim 6, wherein the second region is associated with a right-shift key and an enter key of the keyboard.

10. The system of claim 6, wherein the first region is associated with a plus key and an enter key of the numeric keypad.

11. The system of claim 6, wherein the first antenna is used to exchange data over a Wi-Fi network when the user's hands block the Wi-Fi signal for the second antenna.

12. The system of claim 6, wherein the second antenna is used to exchange data over a Wi-Fi network when the user's hands block the Wi-Fi signal for the first antenna.

13. A method for reducing degradation of Wi-Fi signals for computers, the method comprising:
    with a first antenna of a Wi-Fi module disposed within a first region of a keyboard of the computer and a second antenna of the Wi-Fi module disposed within a second region of the keyboard of the computer, exchanging data over a Wi-Fi network via the antennas of the Wi-Fi module, wherein:
    keys within each region under which the first antenna and the second antenna are disposed are selected based on a size of the keys; and
    the antennas are positioned between a rubber dome underlying a keyboard of the computer and a metal sheet underlying the keyboard;
    determining whether a processor of the computer is receiving data from the first antenna and the second antenna;
    in response to degradation of the Wi-Fi signal for the first antenna due to a user's hands based on the processor not receiving data from the first antenna, instructing a processor to exchange the data over the Wi-Fi network via the second antenna; and
    in response to degradation of the Wi-Fi signal for the second antenna due to the user's hands based on the processor not receiving data from the second antenna, instructing the processor to exchange the data over the Wi-Fi network via the first antenna.

14. The method of claim 13, further comprising, with the processor of the Wi-Fi module, combining data exchanged with the Wi-Fi network via the first antenna with data exchanged with the Wi-Fi network via the second antenna.

15. The method of claim 13, wherein the first region is associated with a plus key and an enter key of a numeric keypad of the keyboard and the second region is associated with a right-shift key and an enter key of the keyboard.

16. The system of claim 1, wherein the rubber dome underlies all the keys of the keyboard.

17. The system of claim 6, wherein a single rubber dome and a single metal sheet underlie the entire keyboard.

18. The system of claim 17, wherein the metal sheet underlies the rubber dome.

19. The method of claim 13, wherein the first region and the second region are not occupied by a single hand of the user at the same time during typing.

* * * * *